US009710145B2

(12) United States Patent
Zammit-Mangion et al.

(10) Patent No.: US 9,710,145 B2
(45) Date of Patent: Jul. 18, 2017

(54) HUMAN MACHINE INTERFACE DEVICE FOR AIRCRAFT

(71) Applicant: University of Malta, Msida (MT)

(72) Inventors: David Zammit-Mangion, Mellieha (MT); Mateusz Jedruszek, Msida (MT); Alan Muscat, Pembroke (MT)

(73) Assignees: UNIVERSITY OF MALTA, Msida (MT); QUAERO LTD., Mosta (MT)

( * ) Notice: Subject to any disclaimer, the term of this patent is extended or adjusted under 35 U.S.C. 154(b) by 42 days.

(21) Appl. No.: 14/840,207

(22) Filed: Aug. 31, 2015

(65) Prior Publication Data
US 2016/0179327 A1   Jun. 23, 2016

Related U.S. Application Data

(60) Provisional application No. 62/045,171, filed on Sep. 3, 2014.

(51) Int. Cl.
G06F 3/0484 (2013.01)
G06F 3/0482 (2013.01)
(Continued)

(52) U.S. Cl.
CPC ......... *G06F 3/04847* (2013.01); *B64D 43/02* (2013.01); *G01C 23/00* (2013.01);
(Continued)

(58) Field of Classification Search
CPC .. G06F 3/0488; G06F 3/04847; G06F 3/0482; G08G 5/0039; G05D 1/101; B64D 43/02
See application file for complete search history.

(56) References Cited

U.S. PATENT DOCUMENTS 6,112,141 A    8/2000  Briffe et al.
8,159,464 B1 *  4/2012  Gribble ................ G06F 3/0416
                                                     701/3
(Continued)

FOREIGN PATENT DOCUMENTS

EP    2869247 A1    5/2015
GB    2420646 A  *  5/2006  ............. G06Q 10/10

OTHER PUBLICATIONS

Vansairforce.Net forums, Garmin G3X Products—VAF Forums, New (Mar. 25, 2014) Garmin G3X Products, 12 pages.*
(Continued)

*Primary Examiner* — Dale W Hilgendorf
(74) *Attorney, Agent, or Firm* — Harness, Dickey & Pierce, P.L.C.

(57) ABSTRACT

A method and system for interacting with the systems of an aircraft using touch screen technology that includes a human machine interface device for interacting with aircraft systems. The human machine interface including an input/display device configured to provide for navigating among graphical representations of a plurality of aircraft avionics systems via the common human machine interface; selecting an aircraft system via at least one of a touch gesture and a voice command input to the input/display device; inputting an instruction to the selected aircraft system; and outputting information via at least one of visual, aural, haptic and tactile channels.

21 Claims, 13 Drawing Sheets

(51) Int. Cl.
*G06F 3/0488* (2013.01)
*G08G 5/00* (2006.01)
*B64D 43/02* (2006.01)
*G05D 1/10* (2006.01)
*G01C 23/00* (2006.01)

(52) U.S. Cl.
CPC ............ *G01C 23/005* (2013.01); *G05D 1/101* (2013.01); *G06F 3/0482* (2013.01); *G06F 3/0488* (2013.01); *G08G 5/0039* (2013.01)

(56) References Cited

U.S. PATENT DOCUMENTS

| | | | |
|---|---|---|---|
| 8,983,688 B2* | 3/2015 | Servantie | G01C 23/005 |
| | | | 701/14 |
| 9,047,762 B1* | 6/2015 | Neuville | G08G 5/0021 |
| 9,132,913 B1* | 9/2015 | Shapiro | G01C 23/005 |
| 2005/0288831 A1 | 12/2005 | Lusardi et al. | |
| 2007/0055416 A1 | 3/2007 | Allen | |
| 2007/0219676 A1 | 9/2007 | Allen et al. | |
| 2008/0208399 A1 | 8/2008 | Pham | |
| 2008/0215193 A1 | 9/2008 | Hanson | |
| 2008/0262664 A1 | 10/2008 | Schnell et al. | |
| 2010/0097332 A1* | 4/2010 | Arthur | G06F 3/04883 |
| | | | 345/173 |
| 2010/0152924 A1 | 6/2010 | Pandit et al. | |
| 2010/0207888 A1* | 8/2010 | Camiel | G06F 3/0488 |
| | | | 345/168 |
| 2011/0238239 A1 | 9/2011 | Shuler et al. | |
| 2011/0241901 A1 | 10/2011 | Firra | |
| 2013/0124034 A1 | 5/2013 | Lentz | |
| 2013/0132548 A1 | 5/2013 | Cabos | |
| 2013/0179009 A1* | 7/2013 | Gershzohn | G05D 1/101 |
| | | | 701/3 |
| 2013/0215023 A1 | 8/2013 | Bourret et al. | |
| 2013/0261851 A1* | 10/2013 | Komer | G06F 3/0488 |
| | | | 701/3 |
| 2014/0214246 A1 | 7/2014 | Johnson et al. | |
| 2014/0222254 A1 | 8/2014 | Ribich | |
| 2015/0123912 A1* | 5/2015 | Nikolic | G06F 3/04883 |
| | | | 345/173 |

OTHER PUBLICATIONS

Nicola Clark, Touch Screens Are Tested for Piloting Passenger Jets. <http://www.nytimes.com/2013/07/06/technology/passenger-jets-testing-touch-screen-technology.html?pagewanted=all&_r=0>. (last accessed Aug. 2014).

Final Report Summary—ODICIS. <http://cordis.europa.eu/result/rcn/54075_en.html>. (last accessed Aug. 2014).

International Search Report and Written Opinion dated Dec. 18, 2015.

Alapetite et al., "Direct tactile manipulation of the flight plan in a modern aircraft cockpit," Proceedings of International Conference on Human-Computer Interaction in Aerospace, HCI Aero 2012, Brussels, Belgium.

* cited by examiner

HUMAN MACHINE INTERFACE DEVICE FOR AIRCRAFT

FIELD OF THE INVENTION

The present invention relates to a human machine interface device for interacting with aircraft systems.

BACKGROUND OF THE INVENTION

Touch screen technologies have completely changed the way humans interact with different systems and their use is prevalent in several sectors, including the consumer market (mobile phones, tablets, etc.), the automotive industry, the banking sector, and the medical sector. Users can interact with the display by using their fingertips in a variety of single and multi-touch gestures.

Despite the popularity of touch screen technologies, their use within the cockpit environment of modern civil aircraft, as a method of interacting with avionic systems, is still relatively new. The majority of interactions between pilots and the various aircraft systems still take place via devices such as knobs, switches and keypads located mainly on the glare shield and on the central pedestal of an aircraft's flight deck. However, with the development of larger displays and the introduction of more avionics functionality in the cockpit, there has been a greater drive by industry to introduce touch screen functionality into the cockpit.

Several airlines have introduced Electronic Flight Bags (EFB)—which are implemented on tablet devices—in order to eliminate the paperwork that was previously carried by pilots.

On a majority of civil aircraft, autopilot commands (such as airspeed, altitude and heading settings) are input via the Flight Control Unit (FCU) on Airbus® aircraft and the Mode Control Panel (MCP) on Boeing® aircraft. These interfaces consist essentially of buttons, switches and knobs. For instance, on an Airbus® aircraft, in order to set a target value for altitude using such interfaces, the pilot first changes the guidance mode from 'Managed' (in which case the altitude is managed by the Flight Management System (FMS) according to a pre-defined flight plan) to 'Selected' (in which case the altitude is selected by the pilot). This change is achieved by pulling the altitude knob. The pilot then selects the target altitude by turning the knob clockwise to a higher altitude and anticlockwise to a lower altitude. The selected value and autopilot mode is then confirmed by cross-checking the corresponding annunciation made via the Flight Mode Annunciator (FMA) on the Primary Flight Display (PFD). It is possible to have a mixture of guidance modes where some parameters are 'Managed' whereas the rest are 'Selected'.

The current state-of-the-art methods of interacting with the autopilot (and with other aircraft systems) work well and are very reliable. However, they have a number of drawbacks. For example, buttons, switches and knobs need to be distinct, that is, one device has one function. The large number of functions that need to be accessed by the pilot results in a large space needed for buttons, switches and knobs in the cockpit. This results in such devices being located all around the pilot, which is sub-optimal and, in certain cases, even being out of reach of the pilot and he or she will need to get out of the seat to reach the specific device.

Most buttons, switches and knobs are typically located in the glare shield, the main instrument panel, the central pedestal and the overhead panel, requiring the pilot to reach out to operate them. Locating the correct input control and selecting the desired option or value (such as entering a target altitude value in the FCU) can be relatively time-consuming, which is of significance particularly in high workload periods of the flight. This is inconvenient, especially when actions also involve relatively long operation times and careful selection (such as the selection of a specific large altitude change on the MCP/FCU). The situation is further compounded when the pilot needs to reach out to operate the device in turbulence conditions, as this makes the action much more difficult to execute correctly.

Also, input devices (such as the control panels and keypads) are expensive pieces of equipment that get damaged and need replacing during the life of the aircraft.

There are other limitations of using buttons, switches and knobs to control the aircraft. For example, their location may be sub-optimal due to constraints in the space available around the pilot. For example, the MCDU of an FMS is located by the pilot's knee which, although acceptable, would not be preferred if the pilot could instead have the device in front of him or her. Furthermore, buttons, switches and knobs may be located remotely from the display relating to their function. It is not advantageous to have controls and indicators related to the same function located remotely from each other. For example, the displays relating to the aircraft systems such as the fuel, hydraulic and electrical systems are normally located in the central part of the main instrument panel, whilst the switches and buttons controlling them are located on the overhead panel.

The location and use of buttons, switches and knobs may also limit the aircraft to need to be operated by two crew members under normal operating conditions. This may be for various reasons, including pilot workload.

SUMMARY OF THE PRESENT INVENTION

The present invention aims to mitigate at least some of the limitations of current systems and proposes new methods and systems to simplify and improve pilot interaction with aircraft systems.

Touch screen technologies promise to bring many benefits to the cockpit environment. These benefits may include greater convenience and comfort, more pilot-centred interaction with the aircraft systems, improved situational awareness, decreased cost in manufacture, maintenance and repair of flight control systems and, most importantly, reduced workload and increased safety.

To date, exploitation of touch screen technology has primarily focussed on flight and mission management, with applications in the civil environment focussing on relatively strategic functions such as flight planning and system configuration (long-term guidance). The next step is to extend the use of this technology to more tactical functions of flight, such as autopilot control (short-term guidance).

The present invention provides a device, method and system for interacting with the systems of an aircraft (such as, but not limited to, the autopilot, the navigation system and the fuel system) using touch screen technology. This system and method allows pilots to perform the same tasks as with current (traditional) methods but with additional advantages that will be highlighted in the remainder of this document. The invention can be either used in conjunction with current pilot interfaces (such as the FCU/MCP for autopilot interactions) or it can replace the current interfaces completely.

Advantageously, the present invention brings the functions of switches, buttons and knobs closer to the pilot to allow him or her to avoid having to reach out to interact with the said devices.

Advantageously, in the present invention, the interaction with aircraft systems (including the functions of switches, buttons and knobs) is implemented in a more pilot-centric manner to mitigate at least some of the disadvantages identified in current systems.

Advantageously, in the present invention, controls (including the functions of switches, buttons and knobs) and indicators are located in the same area to facilitate crew interaction and mitigate some of the disadvantages identified in current systems.

Advantageously, the present invention allows for different and multiple methods of entry of the same data set to allow user-preferred and context-preferred methods of data entry and thus facilitate the quicker entry of precise information than that afforded by current systems.

Advantageously, methods of pilot input using touch gestures provided by the present invention afford simpler or quicker data entry when compared to conventional methods using knobs and switches such as those on a keyboard.

Advantageously, methods of pilot input provided by the present invention are specific to the particular data being entered, thus reducing the possibility of incorrect or inadvertent pilot entry.

Advantageously, the present invention provides short cut methods to allow the pilot to access specific systems and to enter specific pre-set values to facilitate quicker access to and entry of information.

Advantageously, in the present invention, the touch screen device is reconfigurable to allow the pilot to interact with different systems on board the aircraft.

Advantageously, the present invention allows the pilot to enter commands by a mix of verbal and manual entry, thus facilitating quicker entry of information into the system.

Advantageously, the present invention outputs aural alerts associated with the confirmation of pilot entry, thus facilitating lower pilot workload.

Advantageously, in the present invention, the touch screen device may be portable to reduce manufacture, installation and maintenance costs, reduce operational down-time in the event of system failure and further facilitate pilot operation.

Advantageously, the present invention provides redundancy and lower maintenance costs through simple replacement of the touchscreen device.

According to an example embodiment of the present invention, there is provided a method for interacting with aircraft systems using single and multi-touch gestures. The method allows the user to navigate to a particular aircraft system using a common interface and can handle a range of touch gestures which may include, but are not limited to: tap, hold, drag, pinch, spread, swipe, and rotate gestures.

According to another aspect of the present invention, the method may provide voice recognition as a form of interaction in addition to the touch interaction capability. The voice recognition interaction may be activated and deactivated by means of a dedicated voice recognition toggle (ON/OFF) button. The ability to interact via voice may help to mitigate the negative effects of moderate-to-severe turbulence on touch screen interactions.

According to another aspect of the present invention, the method provides graphical indications corresponding to the operation of various aircraft systems.

According to another aspect of the present invention, the method may provide aural annunciations in addition to graphical indications. Aural annunciations can be (but are not restricted to) voice messages or warning chimes. Aural annunciations can be triggered when a particular event occurs, such as when a target value is captured by the autopilot. Aural annunciations can be very effective at getting the attention of the pilots, especially if the pilots are focussed on a different task and/or the graphical indications mentioned in this method fall outside their field of view.

According to another aspect of the present invention, the method may provide haptic feedback in addition to the graphical indications whenever a touch interaction occurs. Haptic feedback may consist of a touch-coordinate specific response (such as a vibration) which gives the users additional confidence that a touch interaction has been received by the device.

According to a further aspect of the invention, the method may provide tactile feedback where input buttons, keypads, sliders, and/or any other elements and areas of the display may protrude out of the interactive surface of the device and form actual buttons, keypads, sliders, areas, etc., as required by the interface. This ability will take advantage of new and emerging touch screen tactile technologies and make the device better suited and adapted to the cockpit environment.

According to the present invention, there is provided a system, including a bidirectional input/output device (touch screen) and a processing device, the system being constructed and arranged to operate according to a method as defined herein.

According to the present invention, there is provided a device and system that implement the method by acquiring user inputs via touch interactions, exchanges of information with aircraft systems, and outputs of relevant information graphically.

According to a further aspect of the invention, the input may include a voice recognition system to interact with aircraft systems.

According to a further aspect of the invention, the output may include an aural annunciation system to deliver aural messages when certain aircraft system events occur.

According to a further aspect of the invention, the output may include a haptic feedback system to generate a haptic response whenever a touch interaction occurs.

According to a further aspect of the invention, the output may include a tactile feedback system to generate a tactile response whenever a touch interaction occurs.

BRIEF DESCRIPTION OF THE DRAWINGS

An exemplary embodiment of the invention will now be described with reference to the accompanying drawings, in which.

DETAILED DESCRIPTION OF PREFERRED EMBODIMENTS

Figure 1:
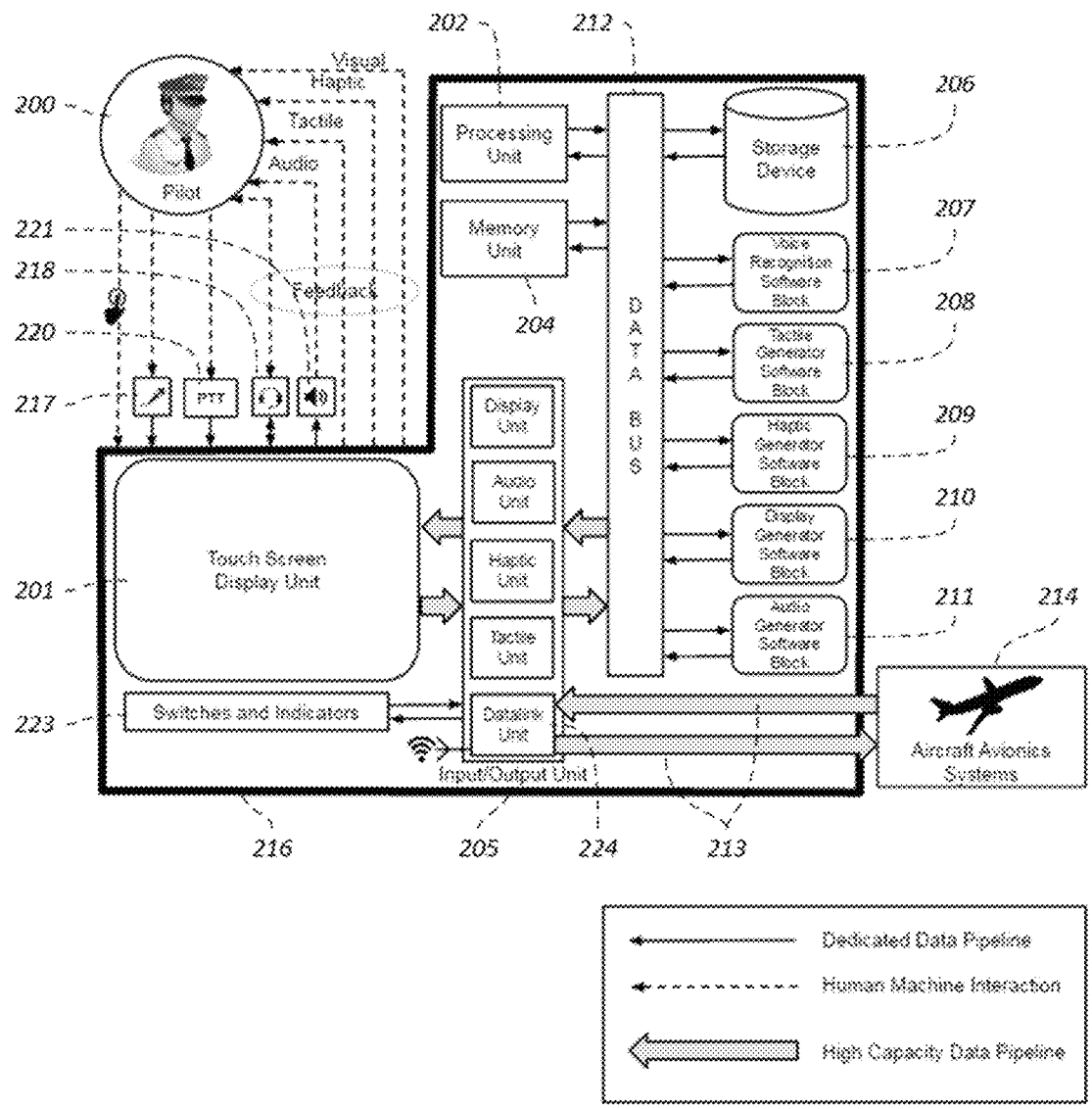
FIG. 1 illustrates an example embodiment of a system that includes a touch screen interface for aircraft system interaction.

Various example embodiments will now be described more fully with reference to the accompanying drawings.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures unless otherwise indicated. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as circuits, program modules or functional processes include routines, programs, objects, components, data structures, etc., that perform particular tasks or implement particular abstract data types and may be implemented using existing hardware. The operations be implemented using existing hardware in existing electronic systems (e.g., display drivers, System-on-Chip (SoC) devices, SoC systems, electronic devices, such as personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), SoCs, field programmable gate arrays (FPGAs), computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "memory," "memory unit," "storage medium," "computer readable storage medium," and the like, may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

In the present embodiment, the Human Machine Interface Device (hereinafter "the Device") is described as a portable computing device (such as a tablet, mobile phone, laptop computer, or other similar device) that communicates with aircraft systems by wired or wireless datalink. It is understood, however, that variations of the Device can be implemented. For example, the Device can be part of the aircraft systems, such as embedded computers and interactive cockpit displays on the main instrument panel for the flight crew to use during flight.

Design features of graphical elements of the present embodiment, such as, but not limited to, icons, colour, size, format, position, interaction method and gesture activating them, can be varied. For example, a graphically represented button may be round or square or may be varied in size and position in relation to other graphical elements on the display. Gestures activating input functions may also be varied. For example, it is possible to replace a double tap gesture for a button with a single tap or swipe, a combination of both or other. Rotary inputs on the graphical touch-screen may be replaced by linear or slider type designs or tapes and variations of these can be made. Furthermore, combinations and sequences of combinations of input actions and gestures may be varied. Such variations can be made to facilitate convenience of use, functionality and improved safety. Furthermore, and in an embodiment of the present invention, a function may also be activated by voice input.

A block diagram of one example embodiment of the Human Machine Interface Device (216) is shown in FIG. 1. The pilot (200) can input information (such as instructions and values) on the Device (216) to the Aircraft Avionics Systems (214) by interacting with the Touch Screen Display Unit (201) or by voice commands. The Aircraft Avionics Systems (214) is a collection of all avionic systems on board a typical aircraft. These avionic systems may include (but are not limited to) the Flight Management System, Navigation System, Flight Control System, Communication System, and Surveillance System. These systems are generally located in the flight deck and in one or more avionic compartments on the aircraft.

It is understood that the Touch Screen Display Unit (201) may advantageously have tactile and haptic feedback using techniques that are generally known. It is also understood that the Touch Screen Display Unit (201) may advantageously also incorporate elements such as, but not limited to, switches, indicators, a speaker, a microphone and a camera, as often found in commercial devices, and these elements may be used as part of the Device (216).

Voice commands can be issued through a microphone (217), which may, but is not restricted to, be part of the headset (218), part of the Touch Screen Display Unit (201) or a separate unit. Furthermore, the microphone (217) and/or headset (218) are equipment generally present on an aircraft and it is understood that these may be the said equipment present on the aircraft or part of the Device (216). In a present embodiment, voice commands are input to the Device (216) when the pilot (200) presses a 'push to talk' (PTT) button (220), which is a button similar to that already existent on aircraft and used by pilots to communicate with air traffic control (ATC). It is understood that the PTT button (220) may be replaced by other devices, such as, but not limited to, the Touch Screen Display Unit (201). The voice commands are processed by a Voice Recognition Software Block (207), which interprets the voice commands and converts them to a digital format that can be processed by the Processing Unit (202). Information can be exchanged between the Device (216) and the Aircraft Avionics Systems (214) via a datalink connection (213), which may be wired or wireless. Information can be relayed back by the Device (216) to the pilot (200) using visual, aural, haptic and/or tactile channels via the Input/Output unit (205). The information on these channels is generated and processed by the Display Generator Software Block (210) to drive the display of the Touch Screen Display Unit (201); the Audio Generator Software Block (211) to drive the speakers (221) and/or headset (218); and the Haptic Generator Software Block (209) and Tactile Generator Software Block (208) to drive the haptic and tactile feedback functions of the Touch Screen Display Unit (201). It is understood that the speakers (221) may be an integral part of the Device (216) or equipment present on the aircraft.

The Input/Output unit (205) is a unit in the Device (216) that includes the necessary hardware and/or software for handling data transfer between systems external to the Device (216), such as the Aircraft Avionics Systems (214), the Touch Screen Display Unit (201), the microphone (217), headset (218), speakers (221) and any other element such as, but not limited to, switches and indicators (223), with the various elements of the Device (216) via the Data bus (212). It is understood that the Aircraft Avionic Systems (214) may include additional datalinks, including wireless datalinks that link the aircraft to other systems external to it, such as ground-based systems. Advantageously, such additional links allow the pilot (200) to display and interact with data external to the aircraft using the Device (216). For example, the pilot (200) may communicate with other systems in the outside world (such as, for example, but not limited to, the Internet), using the Device (216) to access data and communicate with such 'outside world' systems. For example, the Device (216) may allow the pilot (200) to access files stored in a database or a computing device on the ground and upload the files onto the Device (216) via the aircraft datalink. In a present example embodiment, the Datalink unit (224) within the Input/Output Unit (205) of the Device (216) is also able to connect the Device (216) to systems located outside the aircraft. One of the functions of the Datalink unit (224) is to ensure secure communications between the Device (216) and systems located outside the aircraft. This may be achieved in a number of ways, such as by providing restricted system access and/or by encrypting the communication link.

The Device (216) has a Processor (202), a Memory module (204) and a Storage Device (206) that are linked via the Data bus (212). The Memory module (204) is used to store program data and instructions which are read and executed by the Processor (202). The Storage Device (206) stores data that may include, but is not limited to, databases (such as airport and navigation databases).

In a preferred example embodiment of the present invention, the Touch Screen Display Unit (201) is a portable device such as a tablet that can be either hand-held or integrated within the crew operating station. It is understood that the portable device such as the tablet may also incorporate the complete electronic hardware of the Device (216) or parts thereof.

For example, in tablet format, the tablet can be placed on, or be an integral part of, a table mechanism that exists on some present aircraft. Alternatively, the tablet can be connected to, or mounted on, the pilot's arm rest, or in another conveniently accessible location, in a way that the tablet is easy to use. It is understood that various positioning methods and mechanisms can be used to allow the Touch Screen Display Unit (201) or the Device (216) to be placed at positions and angles that are advantageous for use by the pilot (200). Methods and mechanisms may also include means to stow away or remove the Device (216) when required. An example of a potential mechanism is one similar to that used in table seats in the aircraft cabin area where no seat is available in front to accommodate a table, or the seat in front is too far away as is often the case with emergency exit rows. Advantageously, the Device (216) can be easily replaced by a second Device (typically, but not limited to, an identical system), for example in the event the first Device becomes faulty, thus providing redundant backup systems and allowing the pilot (200) to continue interacting with the aircraft.

It is understood that devices other than a tablet, that have similar capabilities to interact with the pilot (200), can be used as the Device (216). For example, the Device (216) may be part of the Aircraft Avionics Systems (214) and the Touch Screen Display Unit (201) may be an integral part of the aircraft displays in the cockpit, where the tablet is replaced by a touch-screen such as those normally found on existent aircraft and are connected to processing devices on board the said aircraft.

In a present example embodiment, the Device (216) may be used by the pilot (200) to interact with various aircraft avionics systems on board the aircraft, typically to view data and input instructions to control the aircraft. For example, the Device (216) may display primary flight information, navigational data, and the status of various aircraft systems (such as, but not limited to, that pertaining to its engine, electrical, pneumatic, hydraulic, fuel, radio, and cabin pressurization systems, the Flight Management System, the flaps and undercarriage). The Device (216) may also allow the pilot (200) to input data to control such systems. For example, via the Device (216) and the datalink connection (213), the pilot (200) may interact with virtually all of the on-board systems of the aircraft, thereby allowing the pilot (200) to program the Flight Management System, reconfigure the electrical system in the event of a fault, start the Auxiliary Power Unit (APU) or the main engines, switch lights on and off or extend the undercarriage. It is understood that the functions included may be several and those described are done only by way of example, since the Device (216) can be used to interact with any system or function on board the aircraft.

In a present example embodiment, the Device (216) is also configured to display data that is currently displayed on aircraft display systems in a format that either replicates or presents similar formats presently used in aircraft displays. Thus, pilots can call up a Primary Flight Display (PFD) window, a Navigational Display (ND) window and various other aircraft system windows. It is understood, however, that variations of the configurations and windows can be used. It is also understood that the graphical layout may be varied to follow trends in computer displays. Furthermore, it is also understood that standard functions (such as, but not limited to, zooming and panning) and typical gesture inputs may be included to facilitate use by the pilot (200). In this way, the present invention brings information relevant to the pilot's tasks and intentions and supports interaction with the relevant systems via a convenient device, thus affording a more pilot-centric solution than current technology.

Figure 2:
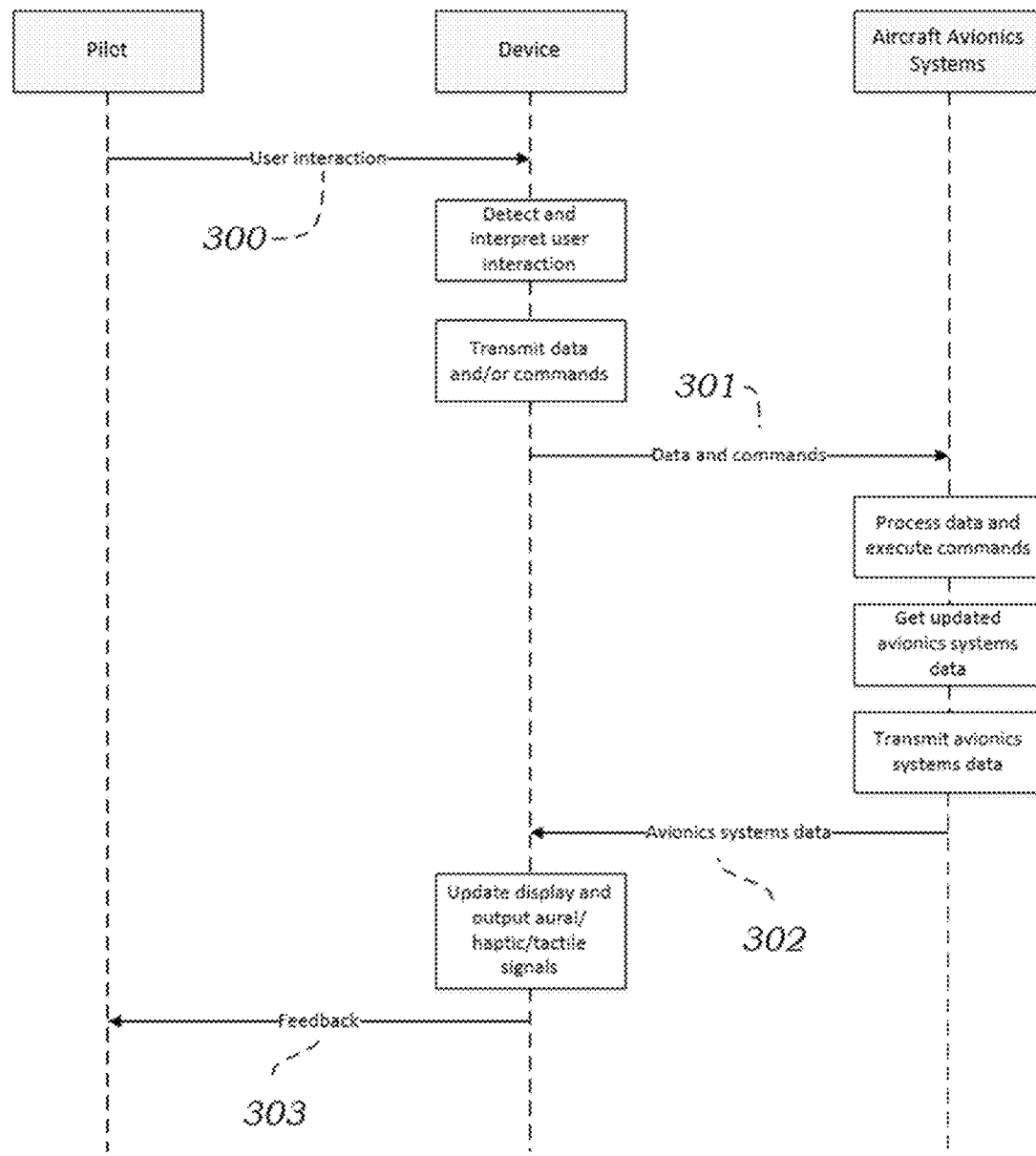
FIG. 2 illustrates an example embodiment of a high-level information flow of the present invention in response to user interactions.

FIG. 2 gives a high-level overview of the process that may be followed in the present example embodiment whenever the pilot (200) interacts with the Device (216), such as by using a touch gesture or a voice command. The pilot enters a command, such as a target altitude, via a keypad or slider as explained further on in the document. First, the Device (216) detects and interprets the user interaction (300) (such as, for example, an autopilot mode button press). The Device (216) may provide graphical, aural, haptic and/or tactile feedback. For example, a pressed key may change size or colour; a slider may change position; the Device (216) may aurally annunciate the pilot entry and the touch screen may provide touch feedback to allow the pilot to better recognise that his or her intended action has been detected by the Device (216). This initial feedback provided by the device is not shown in FIG. 2 for clarity. The Device (216) then transmits the corresponding data and/or commands (301) to the Aircraft Avionics Systems (214) via the datalink connection (213). The relevant Aircraft Avionics System (214) processes the received data and executes any commands. Then, the said Aircraft Avionics System (214) retrieves the latest relevant data (302) (such as, for example, the current aircraft speed) and transmits this data to the Device (216) via the datalink connection (213). The Device (216) then uses the received avionics systems data (302) to provide additional feedback (303) to the pilot (200) via one or more information channels (such as, but not limited to, visual, aural, haptic and/or tactile channels).

In the present example embodiment, functions available on the Device (216) are organized by aircraft system and may be accessed via a tile interface menu. For example, upon start-up, the Device (216) displays a start-up page with tiles relating to different systems, allowing the pilot (200) to select particular systems and functions and navigate through the hierarchical organization with ease. In this way, the pilot (200) can, for example, (a) use the Device (216) to set target values for various aircraft parameters within the autopilot window, then (b) open the ND window, select a display mode (such as PLAN mode) and zoom in onto a specific area on a displayed map, then (c) navigate through the interface menu to select the Electrical system page and check the status of the generators. This sequence is presented by way of a non-limiting example to illustrate the scope of functionality on the Device (216). It is understood that various operations and their combinations thereof can be supported by the Device (216).

Figure 3:
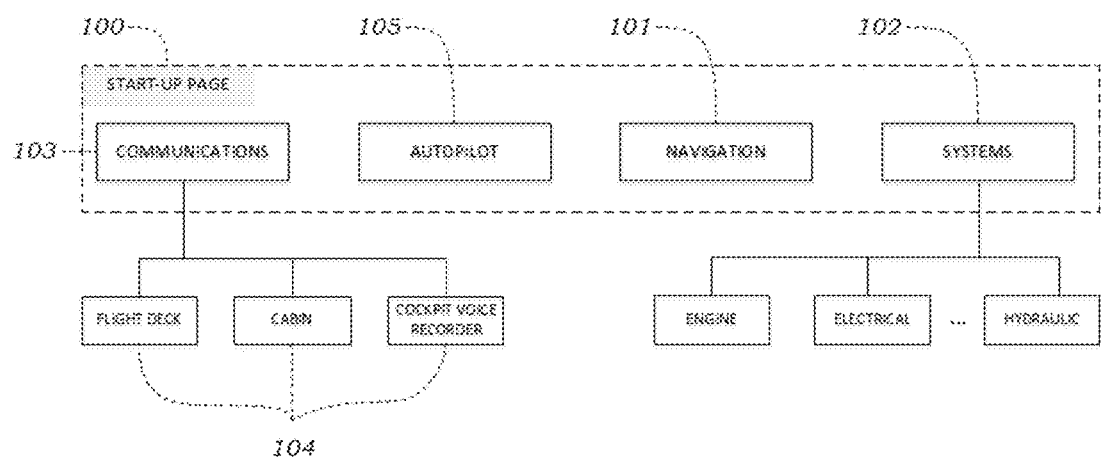
FIG. 3 illustrates an example embodiment of a hierarchical menu of a graphical user interface of the present invention.

FIG. 3 illustrates an example of the hierarchical organisation of a menu that may be used for the tile interface menu. The illustrated example is not an exhaustive example and is only meant as an example of how systems may be accessed.

It is also understood that the menu structure may reflect the organisation of the aircraft and may be therefore specific to the particular aircraft type. Typically, the top-level menu is contained in a start-up page (100), where a tile relates to each of the main aircraft systems/functions. Depending on the tile selected, the pilot (200) may be presented with a sub-menu of tiles or may be taken directly to the selected system/function. For example, the Communications (103) system is a major system consisting of sub-systems (104), each of which may be handled on a separate page and may therefore be accessed through separate menu options. The tiles corresponding to the menu items at a particular level of the hierarchy may not fit in a single page. In this case, the pilot (200) may navigate to the required tile by, for example, swiping through multiple menu pages.

Some pilots may access certain systems (or sub-systems) more often than others. To provide quick access to these favourite systems and allow customization, the pilot (200) may add shortcut tiles associated with these systems to the top-level menu. This may be particularly useful if the tiles associated with such systems are normally located several levels down within the menu hierarchy.

Apart from navigating manually to the page/window associated with a particular system, the page corresponding to a system may also be triggered automatically if a particular event occurs, such as, for example, but not limited to, a major failure related to the system and which may require the pilot's immediate attention. In this case, the page related to the damaged system may take priority over the page which is currently being displayed to the pilot (200). Alternatively, a popup warning message may be displayed to inform the pilot (200) of the failure. The pilot (200) may then select the warning message to navigate directly to the page of the affected system.

Three different example embodiments of an interface for autopilot control will now be described. In the present embodiment, the pilot (200) may access an autopilot page by selecting an 'Autopilot' tile (105) from the start-up page menu (100). This is shown by way of example in FIG. 3. The autopilot page enables the pilot (200) to control a number of flight parameters, including, but not limited to: airspeed, heading, altitude and vertical speed (see FIG. 4). It is understood that the autopilot of an aircraft may have additional control parameters (such as Flight Path Angle (FPA) and Track (TRK)) and the example embodiments presented here can be modified to control these parameters as well without departing from the scope of the invention.

The three example embodiments are presented to demonstrate different interaction techniques and graphical layouts that may be used to control the autopilot. It is understood that the graphical layout and interactions of a practical implementation may differ from these example embodiments or may contain aspects of one or more example embodiments without deviating from the scope of this invention.

Figure 4:
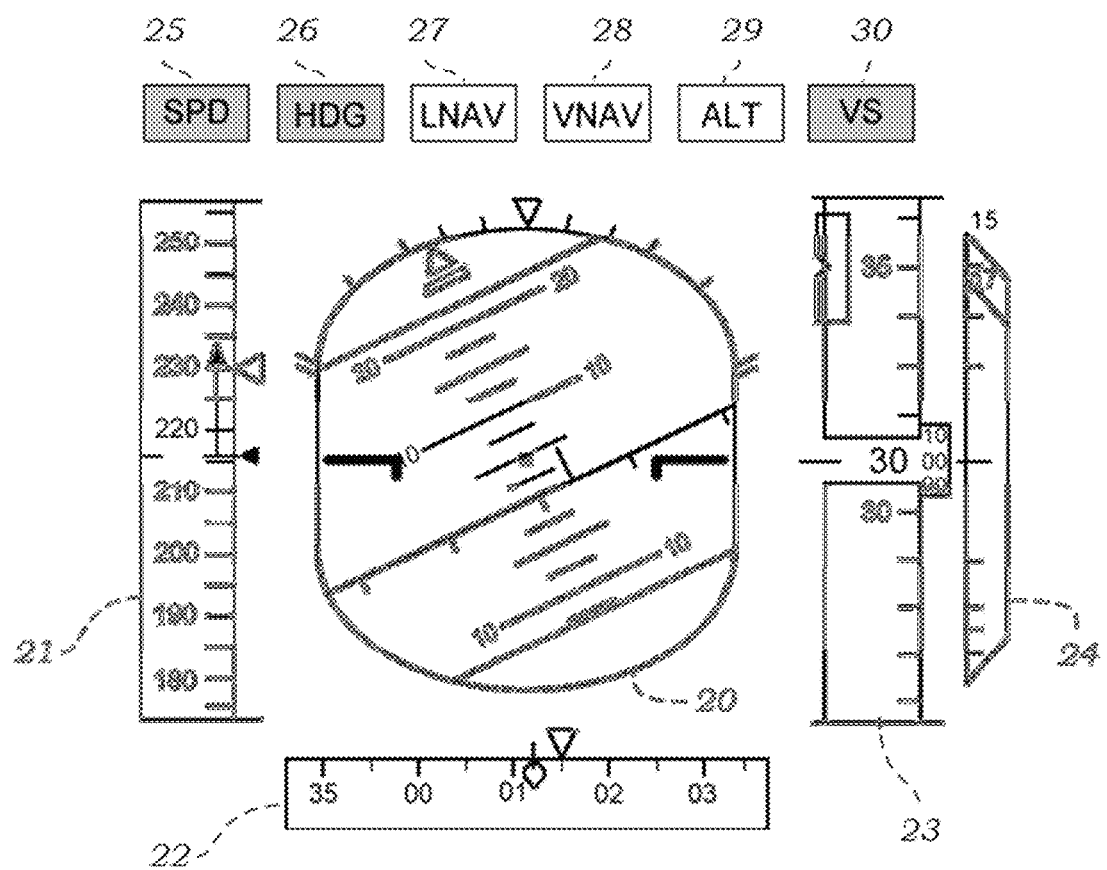
FIG. 4, FIG. 7 and FIG. 10 illustrate example embodiments of a graphical user interface for autopilot control.
Figure 5:
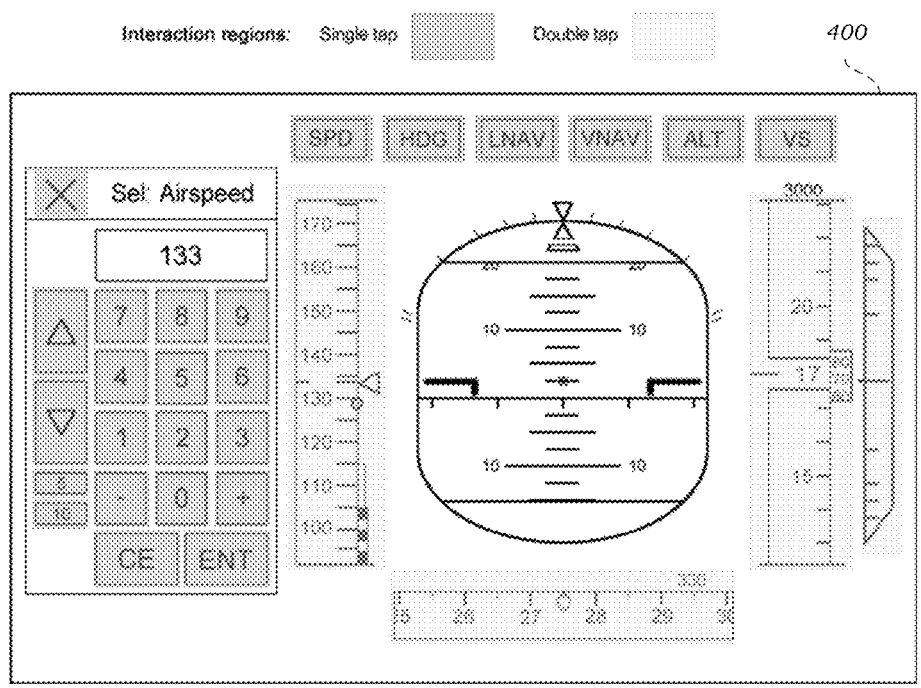
FIG. 5, FIG. 8 and FIG. 11 illustrate example embodiments of interaction regions corresponding to the graphical user interfaces for autopilot control.

The first example embodiment of an interface for autopilot control is shown in FIG. 4. This example interface closely resembles the PFD of a typical large commercial aircraft with a 'basic-T' flight instrument configuration. It is understood that different graphical layouts and formats that deviate from this example embodiment may be used. For the purpose of the present invention, this example embodiment is referred to as the Enhanced Primary Flight Display (EPFD). The EPFD is designed to ensure commonality with display formats currently used on aircraft to ensure safety in use. The interface may include an artificial horizon (20) depicting aircraft pitch, roll and sideslip, together with separate indication tapes for airspeed (21), heading (22), altitude (23) and vertical speed (24). The user can interact with this interface by using touch gestures within the interaction regions (400) highlighted in FIG. 5. It is understood that the size, shape and location of the interaction regions may be varied to facilitate operation.

In order to distinguish between multiple parameter values, different colours may be used. For example, indicated values may be displayed in green whereas target values for 'Managed' and 'Selected' modes may be displayed as bugs (or numbers) in magenta and cyan respectively. In the example embodiment shown in FIG. 4, values are displayed in knots for airspeed; degrees magnetic for heading; feet and Flight Level (FL) for altitude; and 100s of feet per minute (fpm) for vertical speed. The airspeed tape contains visual indications for minimum and maximum speeds as well as a speed trend arrow. Similarly, the altitude tape contains a visual reference of the ground. This follows standard practice and format currently used on aircraft and it is understood that variations in colour, size, format and shape of various symbols and other graphical elements may be used.

Referring to FIG. 4, at the top of the interface is a row of single-tap buttons. The Lateral Navigation (LNAV) and Vertical Navigation (VNAV) mode buttons (27, 28) are used to enable or disable 'Managed' lateral and vertical modes respectively whereas the Speed (SPD), Heading (HDG), Altitude (ALT) and Vertical Speed (VS) mode buttons (25, 26, 29, 30) are used to enable or disable the 'Selected' mode for airspeed, heading, altitude and vertical speed, respectively. It is understood that the characteristics of the buttons such as colour, shape, size, position format or input action (e.g., single tap, swipe, etc.) may be varied. It is also understood that buttons may be omitted or replaced by alternative touch-screen functions that carry out a similar task. Furthermore, it is also understood that other buttons may also be added.

Figure 6A:
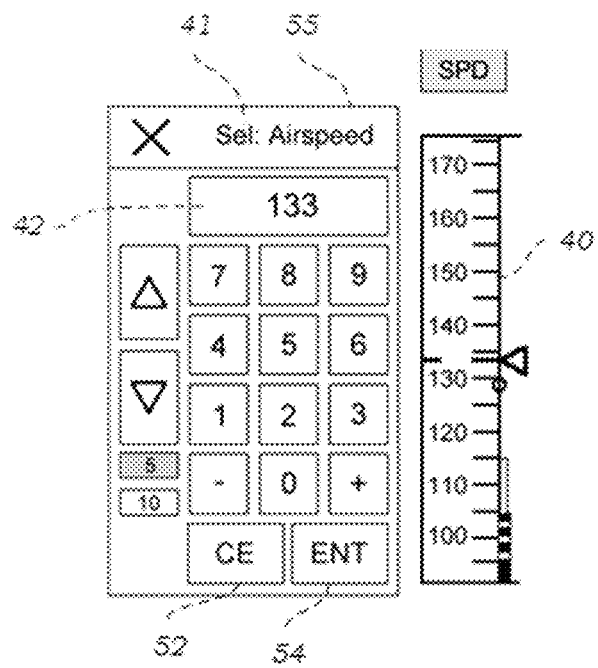
FIGS. 6a-6d illustrate example embodiments of a keypad interface for target selection of autopilot control parameters.
Figure 6B:
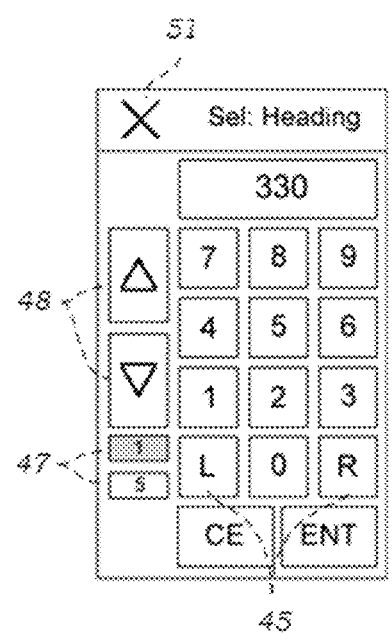
Figure 6C:
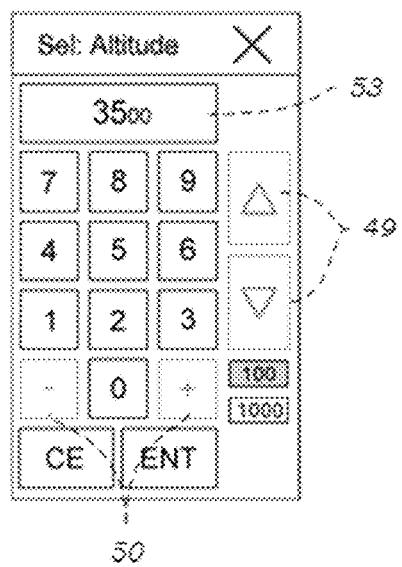
Figure 6D:
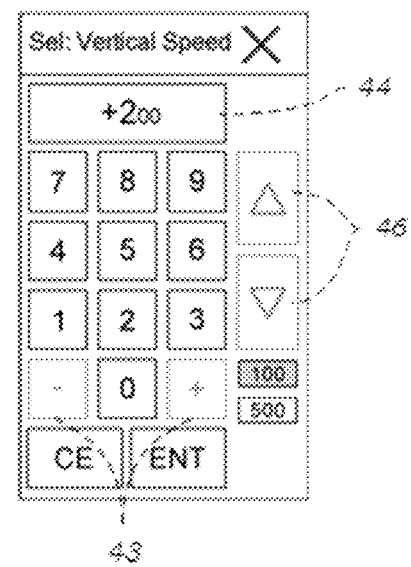

As shown in FIG. 6*a*, selecting (such as double-tapping) any of the tapes (40) highlights its outline and opens a keypad (55) for user input. User-selected target values can be input by means of the keypad (55). The keypad (55) may have different formats, positions, sizes and layouts, depending on the specific data (such as, but not limited to, airspeed, heading or altitude) that is being entered. It may also be possible for the user (200) to move the keypad (55) around the display for convenience of access and visibility. In a present embodiment, this is achieved by using the gesture of touch-hold-drag currently used in the consumer industry to move windows around on a touch-screen. In an example embodiment, the keypad (55) has a label (41) to indicate which flight parameter is being modified. The current target value may be initially shown in the keypad display (42). For airspeed and heading selection, the keypad (55) is located on the left side of the interface; for altitude and vertical speed, the keypad (55) is located on the right side. In the present example embodiment, a new target value can be selected in several ways, including:

(a) Entering a relative change (deviation from the current target value) by means of a user-defined value. In the present embodiment, for airspeed, altitude or vertical speed, the user selects the '+' or '−' button (43) followed by a numerical value (44) (FIG. 6*d*). For heading, the user selects the 'L' or 'R' button (45)—to indicate a left or right turn respectively—followed by a numerical value (FIG. 6*b*). When this method is used, the arrow buttons (46) on the keypad (55) are disabled to guide the user and reduce the chance of incorrect data entry (FIG. 6*d*).

(b) Entering a relative change by a pre-defined amount. The user may choose between a number of step sizes (47) and use specific keys (in the present embodiment the up and down arrow keys (48)) to increase or decrease the target value by the entered pre-defined amount respectively.

(c) Entering an absolute value using the numeric keypad (55). As soon as the user enters the first numerical digit, the keypad buttons corresponding to relative target changes (49, 50) are disabled to guide the user and reduce the chance of incorrect data entry (FIG. 6c).

It is understood that variations of these example embodiments may be used, including, but not limited to, variations of the button captions, functions, number and value of pre-defined step sizes.

The keypad (55) can be closed by selecting (such as tapping) the 'close button' (51) located at the upper left corner of the keypad (55) (FIG. 6b). Incorrect or unwanted keypad inputs can be cleared using the 'cancel button' (52) (FIG. 6a). This resets the target back to the value it had before the keypad (55) was opened. The user confirms a new target value (53, 44) by selecting the 'enter button' (54) and arms the autopilot by selecting the corresponding mode button at the top of the display (25, 26, 29, 30 shown in FIG. 4). In the present example embodiment, the keypad (55) is closed when the 'enter button' (54) is released. If the target value falls outside the visible range of the corresponding tape, the value is displayed at the top or bottom of the tape (for airspeed, altitude and vertical speed) or to the left or right of the tape (for heading). In the present example embodiment, the buttons designed follow current trends in technology and usage and it is understood that different formats may be used to carry out the same functions.

Various entries may also be commanded by voice via the microphone (217) and or the headset (218). For example, the pilot (200) may set the aircraft speed to 240 kts by saying verbally 'REDUCE SPEED TWO-FORTY KNOTS', whereby the Device (216) will carry out the action equivalent to that command as if it were entered via the keypad (55). Similarly, the pilot (200) may command 'LEFT HEADING TWO-SEVEN-ZERO' to command a left turn onto heading 270°. It is understood that all entries on the Device (216) can be made via direct voice entry. In a present example embodiment, the pilot (200) presses the PTT button (220) to turn on the microphone (217, 218) before giving a voice command.

It is also understood that, through the Voice Recognition Software Block (207), the Device (216) may accept sequences of direct voice input commands. For example, 'DESCEND LEVEL ONE-FIVE-ZERO CHANGE ONE TWO EIGHT DECIMAL FIVE FIVE' may be interpreted by the Device (216) as a command to program the autopilot to descend the aircraft to flight level 150 and to change the active radio onto frequency 128.55 MHz.

The Device (216) is also capable of confirming entries by audio or visual output. For example, after the pilot (200) will have commanded 'LEFT HEADING TWO-SEVEN-ZERO', the Device (216) may, on programming the autopilot, output the advisory alert 'TWO-SEVEN-ZERO SET'. Advantageously, the Device (216) is also capable of generating sequences of aural alerts. It is understood that other aural alerts may be generated and these may be selected according, but not limited to, aircraft type and standard operating procedure (SOP). It is also understood that audio output may be used in different example embodiments, including, but not limited to, the two embodiments further described and that direct voice input and audio alerting may be used in conjunction in all interactions involving pilot (200) input. In this way, it is also possible to program the Device (216) and the Aircraft Avionics Systems (214) via aural interaction with the Device (216) alone or using combinations of manual (touch) and aural entry.

Figure 7:
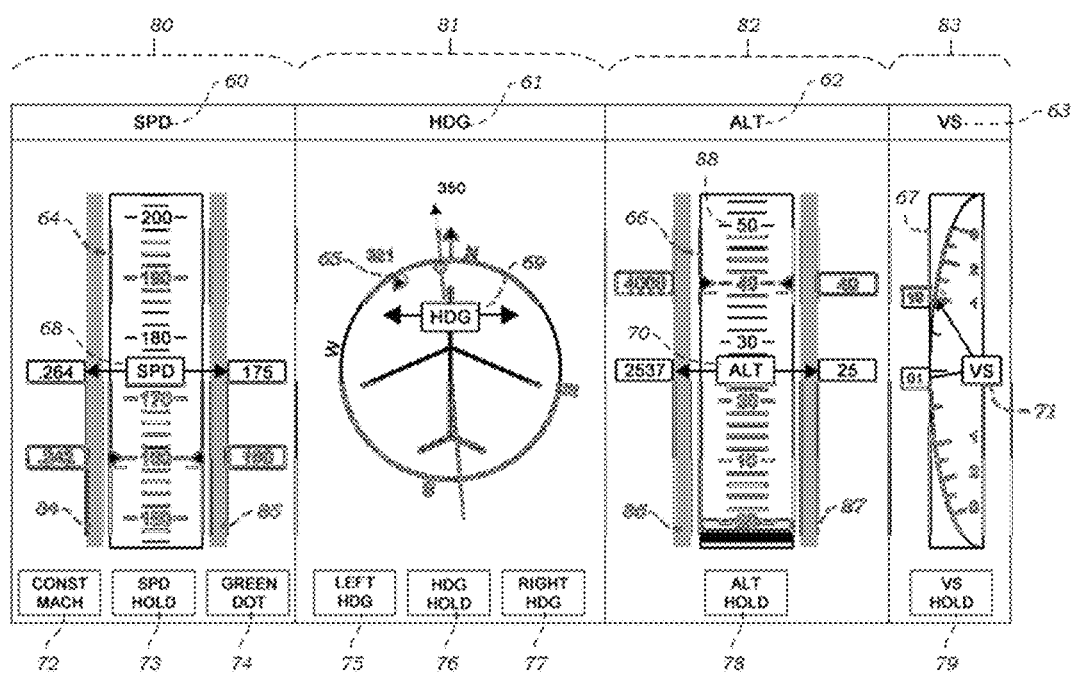
Figure 8:
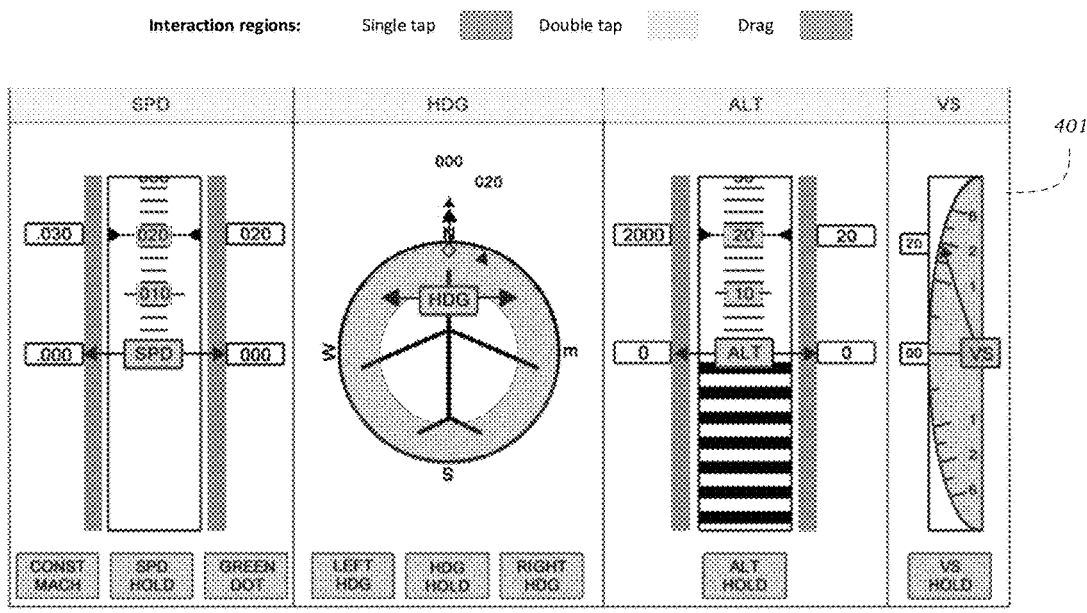

A second example embodiment of an interface for autopilot control is shown in FIG. 7. For the purpose of the present invention, this embodiment is referred to as the Hybrid interface. Primary flight information is displayed using indicators that display the current value of the flight parameters. The display layout is split horizontally into four sections corresponding to airspeed (80), heading (81), altitude (82) and vertical speed (83). As for the first example embodiment (the EPFD), the current values of the flight parameters may be shown in green whereas 'Managed' and 'Selected' values may be shown in magenta and cyan respectively. The user can interact with this interface by using touch gestures within the interaction regions (401) highlighted in FIG. 8. It is understood that variations in colour, size, format and shape of various symbols and other graphical elements may be used.

In the example, current and target values are depicted numerically and by means of triangular markers located on each of the indicators. In a preferred embodiment, values are displayed in knots and Mach number for airspeed; degrees magnetic for heading; feet and FL for altitude; and 100s of fpm for vertical speed. The airspeed tape (64) contains visual references for the maximum and minimum airspeed values. Similarly, the altitude tape (66) contains a visual ground reference. The heading dial (65) shows aircraft heading and track.

In a preferred example embodiment, a button at the top of each section allows the pilot (200) to switch between 'Managed' and 'Selected' guidance modes for the corresponding parameter (speed 60, heading 61, altitude 62, vertical speed 63). These modes are standard modes on typical aircraft in operation and it is understood that button functions may be changed, added or deleted to reflect modes relevant to specific aircraft.

A button located close to the centre of each section (68, 69, 70 or 71) allows the pilot (200) to confirm the respective selections inputted and to arm the autopilot. In the present example embodiment, the button (68, 69, 70 or 71) is initially deselected in order to allow the pilot (200) to select a target value (by interacting with the parameter tapes and dials as explained below) without passing it onto the autopilot. This action is referred to as passive mode selection. When the pilot (200) intends to confirm the target value and arm the autopilot with this target, the button (68, 69, 70 or 71) is pressed and its colour is changed (for example from green to cyan) to indicate this. This is referred to as active mode selection. It is understood that colours may vary and are only selected to conform with current standards on present aircraft.

Pilots may select target values by interacting directly with the tapes and dials. For example, to select a target airspeed, the user (200) can either select (such as by tapping) one of the graduations on the airspeed tape (64)—which, in a present example embodiment, are spaced at 10 knot intervals—or drag one of the bars (84, 85) located on either side of the tape to change the selected value. In a present example embodiment, the pilot (200) can initiate the drag gesture anywhere on the bar and may repeatedly drag the slider, which acts as a form of 'thumb wheel', until the desired target value is reached. If the target airspeed is greater or less than the visible range of the airspeed tape, it is displayed at the top or bottom of the tape respectively. It is understood that specific layout details such as the interval between graduations, the visible range of the airspeed tape and the location and format of specific elements (such as the slider bars) may vary and any appropriate variation may be used.

The pilot (200) can also set a target airspeed by selecting one of the buttons (72, 73, 74) located at the bottom of the airspeed section (80). To hold the airspeed at the current Mach number, the 'CONST MACH' button (72) is selected. Similarly, to hold the airspeed at the current value in knots, the 'SPD HOLD' button (73) is selected. To set the airspeed to the Green Dot speed (which is the aircraft speed which provides the maximum Lift to Drag ratio when the aircraft is in a clean configuration (i.e. with gear and flaps up) and varies with aircraft weight and altitude), the 'GREEN DOT' button (74) is selected. The Green Dot speed can also be selected by selecting (such as tapping on) the corresponding visual reference within the airspeed tape (64) when this is displayed.

Figure 9:
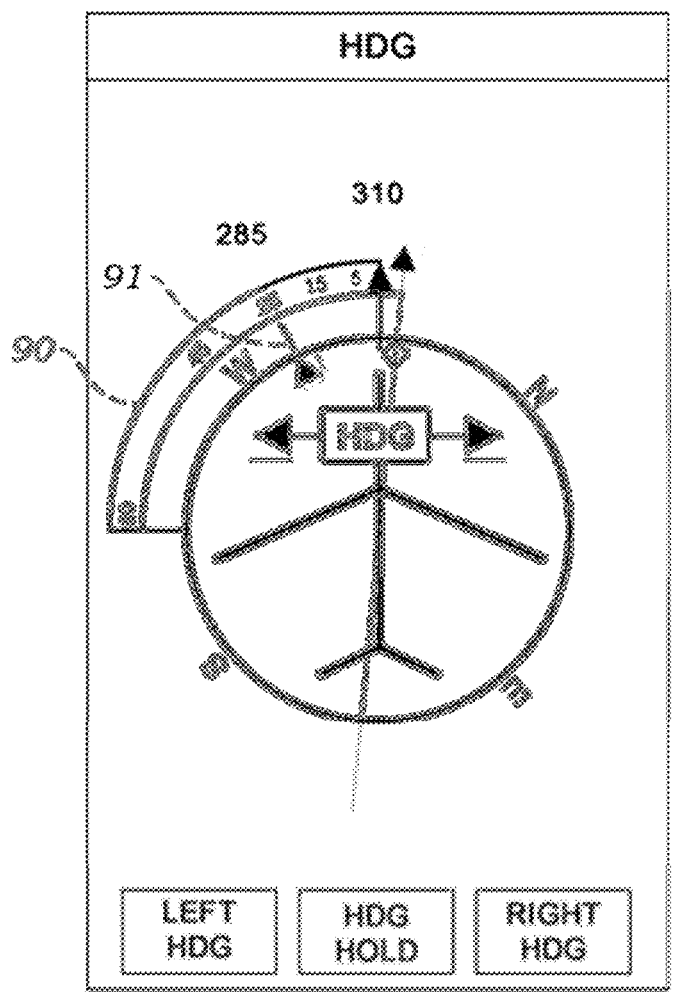
FIG. 9 illustrates an example embodiment of a graphical user interface for target heading selection.

To select a target heading, one of a number of options can be used. In a present example embodiment, this may include:
(a) Selecting an absolute heading. This is done by dragging a finger in a circular motion within the heading dial (65), clockwise to increase the selected value and counterclockwise to decrease it.
(b) Selecting a relative heading change (by a pre-defined constant). First, the direction of the heading change is selected by the pilot (200). This is done through the selection of either the 'LEFT HDG' button (75) or the 'RIGHT HDG' button (77) at the bottom of the heading section (81). For example, if the 'LEFT HDG' button (75) is selected, the heading dial changes as shown in FIG. 9. With this display format, the user drags the heading lubber line (91) along the arc (90) to the desired value. Advantageously, this line (91) may automatically increment or decrement in steps, snapping to graduations as the pilot (200) drags his or her finger along the arc (90).
(c) Holding the current heading. To hold the heading at the current value, the 'HDG HOLD' button (76) is selected from the bottom of the heading section (81).

Referring back to FIG. 7, to select a target altitude, the pilot (200) can either select (such as by tapping on) a numerical marker (88) on the altitude tape (66)—which, in a present example embodiment, has numerical markers at 1000 feet intervals—or drag a finger along one of the bars located on either side of the tape (86, 87). In a present example embodiment, target altitude values that are outside the visible range of the tape are displayed at the top or the bottom of the tape, depending on whether the target value is higher or lower than the present altitude. Alternatively, the pilot (200) may select the 'ALT HOLD' button (78) located at the bottom of the altitude section (82). This maintains the altitude at the current value and resets the vertical speed to 0. It is understood that variations may be made to the present embodiment. Variations may include, but are not limited to, the interval between numerical ticks and the visible range of the altitude tape.

To select a target vertical speed, the pilot (200) may drag a finger up or down along the vertical speed tape (67). Alternatively, to hold the current vertical speed, the user can select the 'VS HOLD' button (79) located at the bottom of the vertical speed section (83).

Figure 10:
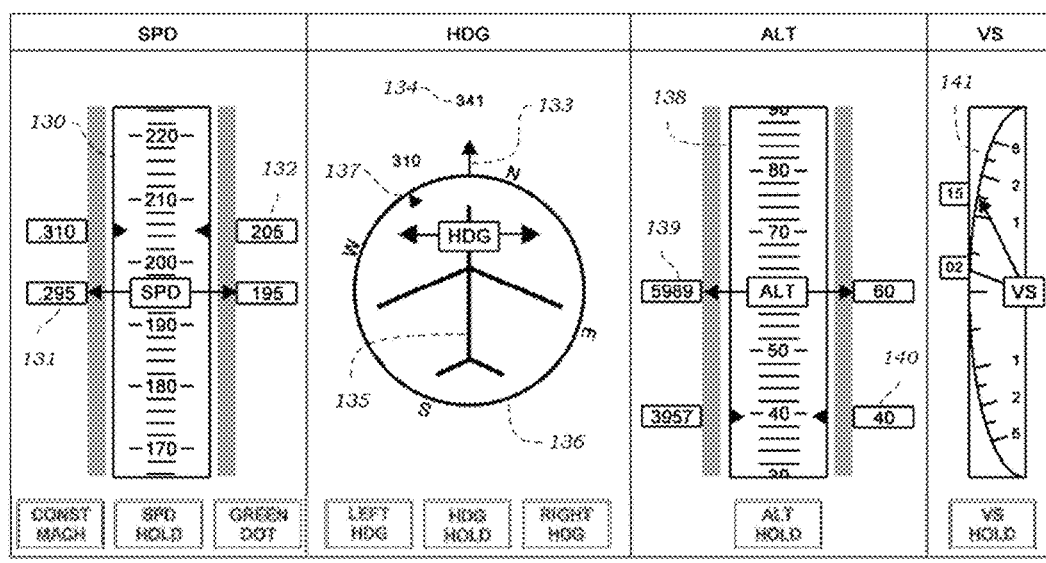
Figure 11:
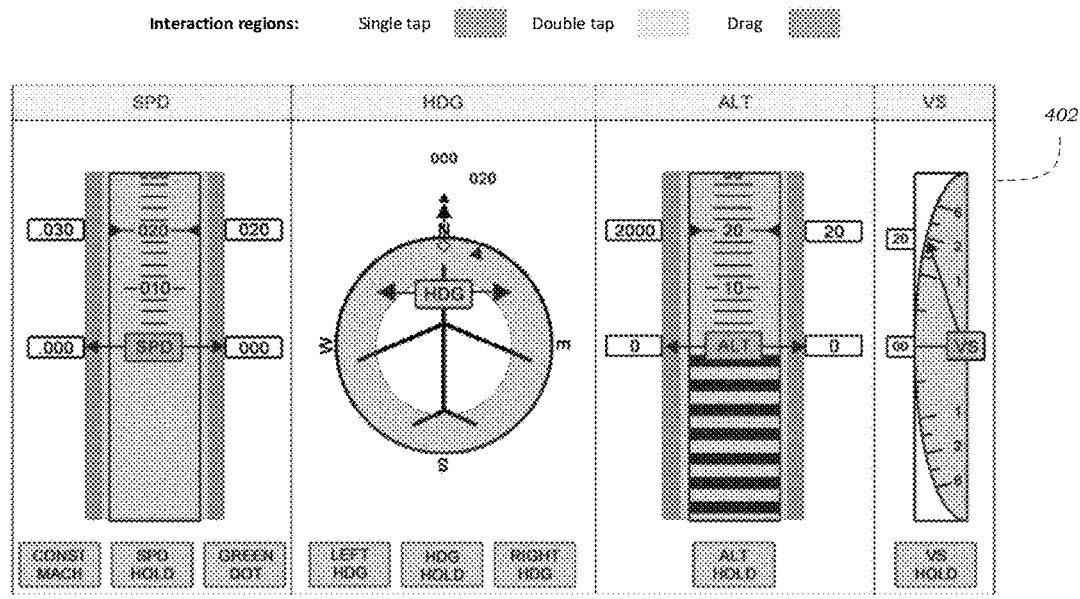

A third example embodiment of an interface is shown in FIG. 10. In this example embodiment, the indicators and controls are focused on the ('Managed' or 'Selected') target values instead of the current values of the flight parameters as presented in the second example embodiment (i.e. the Hybrid interface), and present flight information is treated as supplementary. For the purpose of this invention, this interface is referred to as the Enhanced Flight Control Unit (EFCU). The layout of this interface is shown in FIG. 10 whereas the interaction regions (402) are shown in FIG. 11. In this example embodiment, the target airspeed and altitude values and markers (131, 139) are displayed at the centre of the respective tapes (130, 138) and present values (132, 140) move along the respective tapes as the aircraft maneuvers to reach the target values. The marker corresponding to the target heading (133) points to the top of the interface and the numerical value of the target heading (134) is located above the marker. The aircraft symbol (135) within the compass dial (136) corresponds to the target aircraft heading and points to the top of the display. The marker corresponding to the present aircraft heading (137) moves along the compass dial as the aircraft changes heading. The vertical speed tape (141) is functionally the same as for the Hybrid interface.

All of the buttons in the EFCU interface work in the same way as for the Hybrid interface. However, in the case of the airspeed and altitude tapes, the user is able to set a target value by applying a drag gesture within the tape itself or within one of the bars on either side of the tape. Also, the user is not allowed to select a target airspeed or altitude value by tapping the numerical graduations. It is understood that variations in colour, size, format and shape of various symbols and other graphical elements may be used.

For each of the example embodiments presented above, once a target value is reached (captured) by the autopilot, the corresponding bug (or number) may change colour in order to inform the pilot (200). Similarly, other changes and display elements, acting as 'attention-getters', may be used to inform the pilot (200) when specific autopilot events occur, such as when the autopilot automatically disengages or re-engages in or reverts to a particular mode. These attention-getters may be visual indications, aural annunciations, or a combination of both.

For each of the example embodiments presented above, a time limit may be imposed during passive mode target selection such that the value selected or entered by the pilot (200) is ignored, cancelled or reset to its previous value if it is not confirmed by the pilot (200) within the prescribed time limit. In such an event, the Device (216) would not program the autopilot. This is a safety feature which reduces the possibility of inadvertent data entry.

In a further feature of the present embodiments, direct voice entry values may be displayed on the appropriate areas of the Touch Screen Display Unit (201) in accordance with the disclosed embodiments. Advantageously, this allows the pilot (200) to enter values verbally rather than manually on, for example but not limited to, the keypad (55).

An example embodiment of an interface for electrical system interaction will now be described with reference to the example graphical user interface displayed in FIG. 12. It is understood that different graphical layouts and formats that deviate from this embodiment may be used. In the present embodiment, the pilot (200) can access the electrical system page by first selecting a 'Systems' tile (102) from the start-up page menu (100) and then navigating through the corresponding sub-menu to the electrical system option. This is shown by way of example in FIG. 3.

The electrical system page allows the pilot (200) to view the current status of the electrical system as well as interact with its various components using touch screen gestures. In a present embodiment, the pilot (200) may also navigate back to the start-up page menu (100) by selecting the 'Home' button (170), or select a different system page by navigating through the 'Systems' sub-menu shown on the right side of the electrical system page. The 'ELEC' button (167) is highlighted to indicate that the electrical system page is being displayed. It is understood that different methods or colours may be used to indicate that the 'ELEC' button is highlighted.

Figure 12:
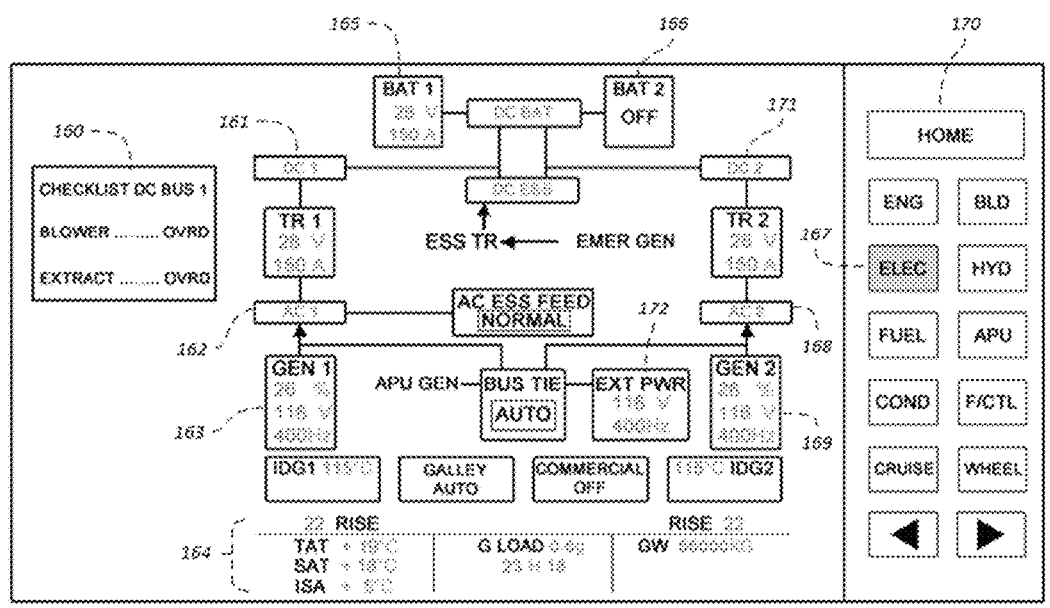
FIG. 12 illustrates an example embodiment of a graphical user interface for electrical system interaction.

The electrical system page shown in FIG. 12 closely resembles the electrical page of a typical large commercial aircraft. The status and values associated with different electrical components are indicated by the use of different colours. For instance, in the case of Generator 1 (163), the green colour indicates that the generator parameters (such as the voltage) are within normal limits. On the other hand, in the case of DC bus 1 (161), the amber colour indicates that operation is outside normal limits. In this case, the crew must be aware of the configuration/failure but do not need to take immediate action. To assist the pilot (200) in dealing with such a problem, a checklist (160) may be displayed. As each of the steps in the checklist is completed by the pilot (200), the checklist is updated to display the remaining steps. The checklist is removed once all the steps have been completed.

At the bottom of the interface, several aircraft parameters are displayed (164). These may include, but are not limited to, temperature, 'G' load and gross weight.

The pilot (200) can also use the electrical system page to perform several actions related to the electrical system. For example, in a present embodiment, the batteries (165, 166) or the generators (163, 169) may be switched ON or OFF by tapping the corresponding graphic (165, 166, 163 or 169), which toggles the state (ON or OFF); similarly, the AC buses (162, 168) and an external power source (172) may be connected or disconnected by tapping the corresponding graphic (162, 168 and 172 respectively). Whenever the pilot (200) taps a graphic, the graphic is updated (such as, for example, by changing its label, shape and/or colour) in order to indicate the state of the function or system associated with it. In a present embodiment, according to FIG. 2, when a graphic is tapped and its state changed, the Device (216) transmits a message via the datalink connection (213) to the relevant Aircraft Avionics System (214), which will then execute a command (such as switching a generator ON or OFF). The Aircraft Avionics System (214) will then retrieve the updated avionics system data (such as the new state of the generator) and transmit it to the Device (216) via the datalink connection (213). The Device (216) may update the display on the Touch Screen Display Unit (201), generate an aural alert via the headset (218) or speakers (221) and provide other feedback as relevant to the particular operation. For example, the colour of the text inside the graphic representing Generator 1 (163) may change to indicate the new state of the generator. It is understood that similar processes and information flows are used for all the different systems functions.

Figure 13:
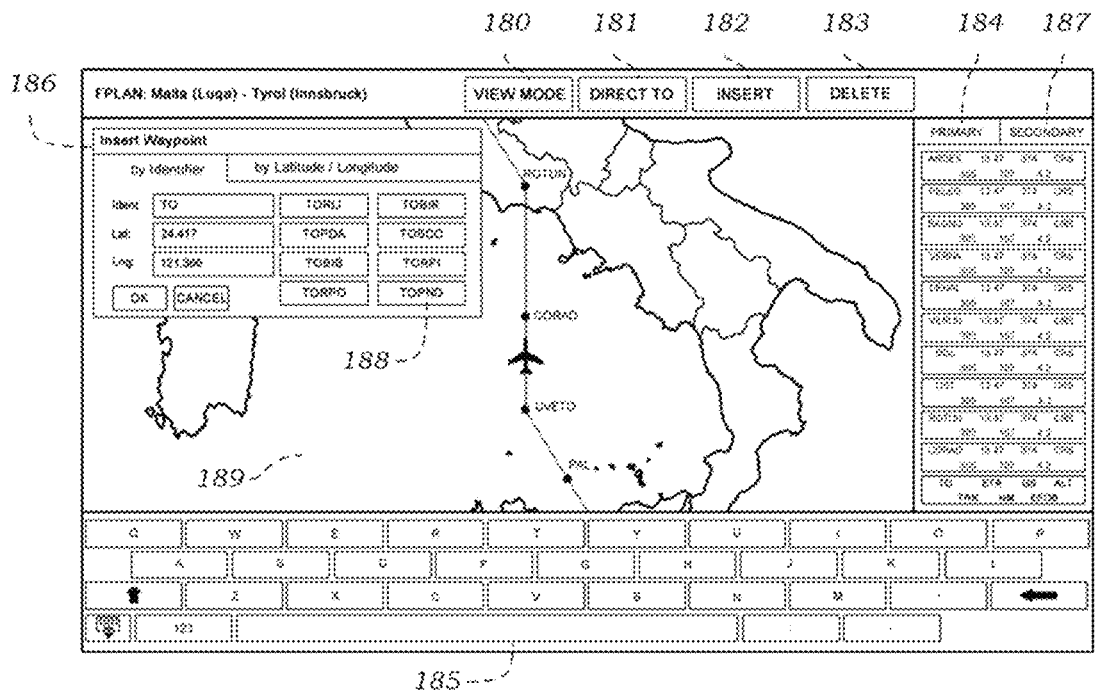
FIG. 13 illustrates an example embodiment of a graphical user interface for navigation system interaction.

An example embodiment of an interface for navigation system interaction will now be described with reference to the example graphical user interface displayed in FIG. 13. It is understood that different graphical layouts and formats that deviate from this embodiment may be used. In the present embodiment, the pilot (200) may access the navigation system page by selecting a 'Navigation' tile (101) from the start-up page menu (100). This is shown by way of example in FIG. 3.

The example embodiment of the ND interface functions in a similar manner to the ND display of typical large commercial aircraft. However, the pilot (200) may also interact with the display (201) by using touch gestures. For example, in the present embodiment, the pilot (200) may toggle between different navigation modes (such as, but not limited to, 'PLAN' mode or 'ROSE' mode) by selecting a 'View Mode' button (180). The pilot (200) may also zoom in/out and pan around the navigation map (189) by using, for example, pinch and drag gestures respectively. It is understood that interaction methods and gestures may vary in line with, for example, industry standards and practices.

In a present example embodiment, the waypoints of the primary and secondary flight plans (184, 187 respectively) are displayed textually on the right side of the ND and the pilot (200) is able to toggle between the two flight plans and make modifications. The waypoints are also displayed graphically by means of markers on the navigation map (189). In order to insert or delete a waypoint, the pilot (200) may select the 'Insert' (182) or 'Delete' (183) button respectively. In the present embodiment, a popup window (186) is displayed when the 'Insert' button is selected. This allows the pilot (200) to select a waypoint either by entering its identification code or by specifying latitude and longitude coordinates. For this purpose, a popup keyboard (185) is displayed. If the pilot (200) begins to insert a waypoint by specifying its identification code, the interface provides suggestions (188) to assist the pilot (200) with waypoint selection. To create a direct leg from the aircraft's present position to any selected waypoint, the pilot (200) may select the 'Direct To' button (181).

In a present embodiment, the pilot (200) may also make changes to waypoints by interacting directly with the navigation map (189). For example, to insert a new waypoint, the pilot (200) may tap and hold a desired location on the map (189). A waypoint may be deleted by swiping the corresponding marker on the map (189). To move a waypoint (for example, to avoid hazardous weather) the pilot (200) may drag its marker along the map (189). It is understood that the gestures associated with specific navigation actions may vary and any appropriate alternatives may be used.

In each of the example embodiments presented above, the pilot (200) may also be able to interact with aircraft systems using voice communication. For instance, the pilot (200) may use verbal commands to select target values for the autopilot or to select a particular radio frequency. Similarly, the Device (216) may use aural annunciations (such as aural messages or alert chimes) in order to communicate with the pilot (200). For example, an aural alert message may be generated if a system fault occurs. The aural alerts may also be coupled with visual popup alerts. It is understood that the generation of aural alerts may be handled by one of the Aircraft Avionics Systems (214) and not necessarily reside within the Device (216). For example, it may be part of an overall crew alerting system on board the aircraft.

In yet another feature of the present invention, the Device (216) may provide multiple forms of feedback in response to pilot (200) inputs associated with touch screen technology or direct voice input. It is understood that this may include, but is not limited to: tactile feedback, haptic feedback (such as vibration), visual feedback (such as the changing of colour or size of graphical elements or combinations thereof), aural feedback and/or combinations thereof.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, any of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium, or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method of interacting with aircraft systems using a human machine interface (HMI), the method comprising:
   providing a single input/display device;
   navigating among graphical representations of a plurality of aircraft avionics systems via the human machine interface (HMI) of the single input/display device;
   selecting an aircraft system via at least one of a touch gesture and a voice command input to the single input/display device;
   displaying graphical representations of indicators representing airspeed, heading, altitude and vertical speed on the single input/display device;
   controlling current flight parameters of at least one of airspeed, heading, altitude and vertical speed via a continuously variable parameter via at least one of a sliding or rotating touch screen gesture; and
   outputting information via at least one of visual, aural, haptic and tactile channels.

2. The method of claim 1, wherein the selecting includes selecting from among at least one of an autopilot system, a navigation system, a communication system, and aircraft systems, and wherein the inputting includes a command instruction via the single input/display device by at least one of a button selection, a keypad entry, voice command and direct interaction with parameter indicators displayed on the input/display device.

3. The method of claim 2, further comprising:
   selecting the autopilot system;
   displaying a keypad; and
   at least one of setting and altering at least one of the airspeed, the heading, the altitude and the vertical speed via the keypad.

4. The method of claim 3, further comprising moving the displayed keypad to a desired position on the input/display device.

5. The method of claim 3, wherein the displaying of indicators representing the airspeed, heading, altitude and vertical speed includes dividing a display screen of the single input/display device into a plurality of display areas and displaying the indicators in a respective display area.

6. The method of claim 3, wherein the at least one of setting and altering the heading includes activating a heading dial displayed on a display screen of the single input/display device, and selecting a relative heading change by dragging a heading pointer along an arc to a desired value.

7. The method of claim 2, further comprising:
   selecting the autopilot system;
   dividing a display screen of the single input/display device into sections representing airspeed, heading, altitude and vertical speed, respectively;
   at least one of setting and altering at least one of the airspeed, the heading, the altitude and the vertical speed via direct interaction with the input display device by a user.

8. The method of claim 7, wherein the at least one of setting and altering includes at least one of tapping a graduation mark on an indicator and sliding a bar associated with the indicator or dragging a line along an arc to a desired value or tapping a graphical representation of a button or making entries via a keyboard.

9. The method of claim 7, further comprising:
   selecting the autopilot system;
   displaying an artificial horizon;
   dividing the display screen of the single input/display device into sections representing artificial horizon, airspeed, heading, altitude and vertical speed, respectively;
   at least one of setting and altering at least one of attitude, airspeed, the heading, the altitude and the vertical speed via direct interaction with the input display device by a user.

10. The method of claim 2, further comprising:
    selecting the aircraft systems;
    navigating between different aircraft systems;
    displaying an aircraft systems screen on the input/display device;
    displaying checklists in the event of a system fault;
    setting and altering aircraft system parameters via direct interaction with the input display device by a user.

11. The method of claim 2, further comprising:
    selecting the navigation system;
    displaying a navigation screen on the input/display device;
    at least one of setting and altering a flight plan by setting or altering waypoints;
    displaying the waypoints graphically on a map displayed on the display screen.

12. The method of claim 11, wherein the setting or altering of waypoints includes displaying a pop-up screen and entering a waypoint into a pop-up window.

13. The method of claim 11, wherein the setting or altering of waypoints includes touching a desired location on the map.

14. The method of claim 2, further comprising setting at least one of an airspeed, heading, altitude and vertical speed by selecting a button displayed on the single input/display device.

15. The method of claim 1, further comprising automatically displaying, without user input, a currently displayed page to a page corresponding to a relevant aircraft avionics system upon occurrence of a triggering event.

16. The method of claim 1, further comprising displaying a keypad on the single input/display device and disabling at least one key of the keypad during inputting of an instruction.

17. The method of claim 16, further comprising moving the displayed keypad to a desired position on the input/display device.

18. A system for interacting with aircraft avionics systems using a human machine interface (HMI) device, the system comprising:
- a single input/display device in an aircraft, the input/display device configured to display user activatable areas on a touch screen of the single input/display device, the activatable areas relating to at least two of an autopilot system, a navigation system, a communication system, and aircraft systems, respectively;
- a datalink connection between the input/display device and aircraft avionics systems, wherein the input/display device is configured to:
  receive flight data from the aircraft avionics systems,
  display flight data pertaining to the aircraft avionics systems via the human machine interface (HMI) on the single input/display device,
  display graphical representations of indicators representing airspeed, heading, altitude and vertical speed on the single input/display device;
  receive input commands from a user controlling current flight parameters of at least one of airspeed, heading, altitude and vertical speed via a continuously variable parameter via at least one of a sliding or rotating touch screen gesture to at least one of the user activatable areas of the HMI,
  transmit input commands to the aircraft avionics systems, and
  monitor and control changes to the aircraft avionics systems.

19. The system of claim 18, wherein at least one of the user activatable areas includes a user activatable subsystem.

20. The system of claim 19, wherein the at least one user activatable subsystem includes displayed information corresponding to a particular subsystem, and a plurality of touch-sensitive areas corresponding to a plurality of controllable functions associated with the particular subsystem.

21. The system of claim 19, wherein the activatable areas are displayed as at least one of a dial, a slider, a navigation map, a keypad and a button.

* * * * *